United States Patent [19]
Daniel et al.

[11] Patent Number: 5,500,917
[45] Date of Patent: Mar. 19, 1996

[54] OPTICAL ASSEMBLY/HOUSING FOR SECURING OPTICAL FIBER COMPONENTS, DEVICES AND FIBERS TO THE SAME OR TO MOUNTING FIXTURES

[75] Inventors: Hani S. Daniel, Rockville; Douglas R. Moore, Severna Park, both of Md.

[73] Assignee: Gould Electronics Inc., Eastlake, Ohio

[21] Appl. No.: 229,023

[22] Filed: Apr. 18, 1994

[51] Int. Cl.⁶ .............................................. G02B 6/255
[52] U.S. Cl. ...................... 385/99; 385/95; 385/98; 385/92; 385/94; 385/43; 385/45
[58] Field of Search .................. 385/78, 80, 43, 385/45, 92, 94, 95, 96, 97, 98, 99

[56] References Cited

U.S. PATENT DOCUMENTS

| | | | |
|---|---|---|---|
| 4,033,668 | 7/1977 | Presby | 385/95 |
| 4,288,143 | 9/1981 | Di Vita | 385/99 |
| 4,474,429 | 10/1984 | Yoldas et al. | 385/49 |
| 4,738,511 | 4/1988 | Fling | 385/42 |
| 4,778,242 | 10/1988 | Ota et al. | 385/96 X |
| 4,867,524 | 9/1989 | Courtney et al. | 385/49 |
| 4,906,068 | 3/1990 | Olson et al. | 385/43 |
| 4,931,076 | 6/1990 | Berkey | 385/43 |
| 4,961,768 | 10/1990 | Djeu | 385/95 |
| 4,971,418 | 11/1990 | Dorsey et al. | 385/95 |
| 5,089,446 | 2/1992 | Cornelius et al. | 501/15 |
| 5,101,464 | 3/1992 | Mousseaux et al. | 385/95 |
| 5,123,074 | 6/1992 | Yokota et al. | 385/14 |
| 5,183,489 | 2/1993 | Brehm et al. | 385/99 X |
| 5,185,835 | 2/1993 | Vial et al. | 385/49 |
| 5,261,018 | 11/1993 | Suganuma et al. | 385/51 |
| 5,367,591 | 11/1994 | Seike et al. | 385/51 |

FOREIGN PATENT DOCUMENTS

0553492A2  8/1993  European Pat. Off. ............... 385/99

*Primary Examiner*—Brian Healy
*Attorney, Agent, or Firm*—D. Peter Hochberg; Mark Kusner; Michael Jaffe

[57] ABSTRACT

A method of bonding glass-based optical elements comprising the steps of positioning a first glass-based optical element relative to a second glass-based optical element, applying a glass-based bonding compound about the first and second optical elements, and applying sufficient localized heat to the glass-based bonding compound to cause the glass-based bonding compound to soften and fuse with the optical elements.

27 Claims, 6 Drawing Sheets

OPTICAL ASSEMBLY/HOUSING FOR SECURING OPTICAL FIBER COMPONENTS, DEVICES AND FIBERS TO THE SAME OR TO MOUNTING FIXTURES

FIELD OF INVENTION

This invention relates generally to optical fibers, fiber optic components and devices, and more particularly to securing optical fibers, components or devices to mounting fixtures or other optical components and devices.

BACKGROUND OF THE INVENTION

Over the last 15 years, a number of fiber optic components and devices such as: couplers, attenuators, wavelength division multiplexers/demultiplexers, connectors, filters, switches, fiber-pigtailed semiconductor lasers, isolators, etc., have been developed for use in fiber optic communication systems, sensors and instrumentation. In nearly all of these applications employing fiber optic components or devices, design-specific mounting fixtures are utilized to precisely align, position or secure optical fibers or elements within such optical fiber components or devices. In most of these applications, it is common for such mounting fixtures to be formed of a fused silica material because its low coefficient of thermal expansion closely matches that of the optical fibers and other optical components or devices. In this respect, maintaining the stability and relative position of optical fibers, components or devices, through the correct choice of materials, is particularly critical in that even minor relative movements between such elements may result in large variations or degradation in optical characteristics, such as coupling ratios and insertion losses.

Optical fibers, components and devices are typically secured to a base plate or substrate with an epoxy material. The two most common types of epoxy adhesives used in these applications cure upon exposure to either UV light or heat. The epoxy adhesives are widely used because they are inexpensive, easy to use and in many instances, readily cured. Rapid in-situ cure schedules are also well suited for volume manufacturing.

While epoxies offer a convenient means for attaching optical fibers, components or devices to substrates or to other optical fibers, components or devices, the physical properties of cured epoxies often make such materials less than ideally suited for use in fiber optic systems. In one respect, epoxies typically possess very different coefficients of thermal expansion relative to the optical fibers, mounting substrates, optical components and devices they are used to secure. This difference may affect the stability and relative position of the respective components or devices when exposed to temperature changes. In another respect, epoxies have a tendency to absorb moisture. Such tendency is detrimental in that moisture significantly reduces an epoxy's ability to firmly secure the optical fiber, optical components or devices to other optical fibers, components or devices or to a substrate. In addition, the cured epoxy swells as it absorbs water vapor, and this swelling may strain the relative attachment between optical fibers, or optical components, or optical devices, or the supporting substrates. In general, moisture induced swelling and subsequent degradation of the epoxy adhesive may cause misalignment or even detachment of the optical fibers, components or devices relative to a supporting substrate or other optical elements. Additionally, epoxies exhibit physical degradation from prolonged exposure to environmental conditions, such as thermal, oxidative and photo degradation which may cause a further breakdown of the epoxy structure over such periods of exposure.

As fiber optics continue to penetrate the telecommunications market, product lifetimes of 20 years or more will be mandatory. In order to achieve this degree of performance, new packaging techniques and materials, other than epoxies, will be required for reliably attaching optical fibers, components or devices to supporting substrates and to each other. Ceramic based cements or adhesives may be used in some applications as an alternative to epoxies since these materials are particularly impervious to moisture. One major disadvantage associated with their use, however, is that they require long cure schedules, often at elevated temperatures, which for example, substantially hinder their usefulness in high volume production.

A large variety of glass powders, commonly known as glass frits are used for making joints or seals. These materials are used for making strong, insulating and often hermetic connections between different materials such as glass, ceramics or metals. Due to the inorganic nature of these materials, these materials are particularly impervious to moisture. They consist of various metal oxides such as lead, boron and zinc. However, most of these frits exhibit large coefficients of thermal expansion, typically 10 to 100 times larger than that of silica. Furthermore, the use of these frits requires subjecting the assembled article to long annealing schedules in order to prevent the formation of fractures and also temperatures of between 400° C. to 1000° C. are typically required. However, since the acrylate buffer coating on optical fibers is damaged at 150° C., the buffer precludes the use of furnace based techniques traditionally used to soften and anneal such glass materials. This disparity in the coefficients of thermal expansion, in the event a glass frit with a typical coefficient of thermal expansion is used as an attachment material, may result in the occurrence of a stress at the interface between the fused glass frit and the optical fiber, component, device or support substrate. Such stress may be relieved through the formation and propagation of a crack within the fused glass frit or optical fiber, device or component (cohesive failure) or by the separation of the fused glass frit at the glass frit/optical fiber, device or component interface (adhesive failure). Such cohesive or adhesive failure is undesirable.

The present invention overcomes these and other problems and provides an improved method of using a glass composition for securing optical fibers, components and devices to mounting fixtures or to other optical fibers, components or devices, which method of securing creates a bond between such components that is less susceptible to physical degradation from exposure to adverse environmental conditions and that reduces the likelihood of deterioration of the performance of such components as a result of such exposure than bonding procedures known heretofore.

SUMMARY OF THE INVENTION

It is an object of the present invention to provide means for attaching optical fibers, components or devices to substrates or to other optical fibers, components or devices. Optical fibers, devices, components or substrates will be individually or collectively referred to as a "fiber optic element" or as "fiber optic elements," respectively.

It is another object of the present invention to provide means for attaching optical fibers, a plurality of optical fibers held together or attached by supporting means, components or devices to substrates or other optical fibers, components or devices which provide superior stability and long term performance under prolonged exposure to environmentally adverse conditions.

Another object of the present invention is to provide a means for attaching optical fibers, components or devices to substrates or other optical fibers, components or devices wherein epoxy is not a primary means of securing the respective fibers, components, devices and substrates.

Another object of the present invention is to provide a bonding composition for attaching optical fibers, components or devices to support substrates or other optical fibers, components or devices, wherein the bonding composition includes a metal-oxide based bonding component, an organic binder and a vehicle.

Another object of the present invention is to provide means for attaching optical fibers, components or devices to substrates or other optical fibers; components or devices wherein the fused bonding component of the bonding composition has thermal expansion properties similar to that of the optical fibers, components, devices or substrates.

A still further object of the present invention is to provide a bonding technique as described above which provides optical fibers, components, devices or fiber support substrates with increased service life.

A still further object of the present invention is to provide a bonding technique as described above which minimizes the changes in the optical performance of components or devices such as changes in the "insertion loss" or "coupling ratios" of the fiber optic components or devices.

A still further object of the present invention is to provide a bonding technique as described above which reduces the likelihood of degradation of the performance of the optical fibers, components or devices.

A still further object of the present invention is to provide not only a desirable bond between fiber optic elements, but to provide moisture impervious bonds that result in hermetic seals, thereby protecting the bonded elements from moisture, vapors, including water vapor, and gases that would adversely affect the performance of the fiber optic elements.

In accordance with the present invention, there is provided a method of bonding glass-based optical fibers, components or devices to each other or to glass or ceramic based substrates comprising the steps of: positioning a first glass-based optical element relative to a second glass-based optical element; applying a bonding composition contiguous to at least one of the first and the second optical elements, the bonding composition comprised of a mixture of a metal-oxide-based bonding component, a binder component and a vehicle component, and applying sufficient localized energy to the bonding composition to cause the metal-oxide based bonding composition to soften sufficiently to wet the surfaces of the optical elements and bond thereto.

In accordance with another aspect of the present invention, there is provided a method of bonding at least one first glass-based element to at least one second glass-based element comprising the steps of: positioning at least one first glass-based optical element relative to at least one second glass-based optical element; positioning a glass in contact with the first and second optical elements, the glass having a surface energy less than the surface energy of the first optical element or the second optical element; and causing the glass to be heated until the glass has softened and formed ionic bonds with the first optical element and the second optical element.

In accordance with another aspect of the present invention, there is provided a method of securing at least one fiber optic coupler to a glass support substrate comprising the steps of: positioning at least one fiber-optic coupler on a glass support substrate; applying a bonding compound to the coupler, or couplers, and substrate, the bonding compound comprised of a mixture of glass particulate and an organic binder in a vehicle, the particulate having a coefficient of thermal expansion approximately equal to that of the coupler, or couplers, and the substrate, and having a surface energy which is less than the surface energy of the coupler, or couplers, or the substrate; and heating the substrate with laser energy until the glass particulate softens and wets the surfaces of the coupler, or couplers, and the substrate and bond thereto.

In accordance with another aspect of the present invention, there is provided a method of bonding glass-based optical elements comprising the steps of: positioning at least one optical fiber relative to a glass-based optical element, applying a glass-based compound about the optical fiber, or fibers, and the optical element, applying sufficient localized heat to the glass-based compound to cause the glass-based compound to soften, wet the surfaces of the optical fiber, or fibers, and the optical element and bond thereto.

In accordance with another aspect of the present invention, there is provided a method of bonding glass-based optical elements comprising the steps of: positioning at least one optical element relative to an optical waveguide, applying a glass-based compound about the optical element, or elements, and said waveguide, and applying sufficient localized heat to the glass-based compound to cause the glass-based compound to soften, wet the surfaces of the optical element, or elements, and the waveguide, and bond thereto.

In accordance with another aspect of the present invention, there is provided, a fiber optic assembly formed of a first glass-based element and a second glass-based element joined together by the steps of: positioning the first glass-based optical element relative to the second glass-based optical element, applying a glass-based compound about the first and the second optical elements, and applying sufficient localized heat to the glass-based compound to cause the glass-based compound to soften, wet the surfaces of the optical elements and bond thereto.

This invention further provides a method of bonding glass-based optical elements comprising the steps of positioning at least one first glass-based optical element relative to at least one second glass-based optical element; applying a glass-based compound about said first and said second optical elements; applying sufficient localized heat to said glass-based compound to cause said glass-based compound to soften, wet the surfaces of said optical elements and bond thereto.

DESCRIPTION OF THE DRAWINGS

The invention may take physical form in certain parts and arrangement of parts, embodiments of which will be described in detail in the specification and illustrated in the accompanying drawings wherein.

DESCRIPTION OF PREFERRED EMBODIMENT

Broadly stated, the present invention relates to packaging, positioning and securing optical fibers, components or devices to a support substrate or to other optical fibers, components or devices by means of a bonding composition. As generally understood in the art, the term "components" generally refers to passive fiber optic apparatus, and the term "devices" generally refers to active fiber optic apparatus. Hereinafter, components and devices shall refer to the generally accepted definitions as given above. The bonding composition is generally comprised of a metal-oxide based component, preferably in particulate form, a binder component and a vehicle component. The optical fibers, components or devices are positioned relative to each other, and the bonding compound is applied contiguously to the components. Intensive energy is applied locally to the bonding composition to heat same to a temperature at which the binder component preferably burns away completely and the residual metal-oxide based component drops sufficiently in viscosity so that it flows over and wets the surfaces of the fibers, components or devices wherein such elements are bound together upon cooling. It is believed that some of the vehicle component may evaporate prior to heating. Any vehicle remaining prior to heating evaporates or is burned off during application of the intensive energy. It is further believed that some or all of the binder component is burned away during application of the intensive energy. Importantly, the energy applied is maintained within a predetermined range which is sufficient to cause the metal-oxide based component to soften and flow.

Figure 1:
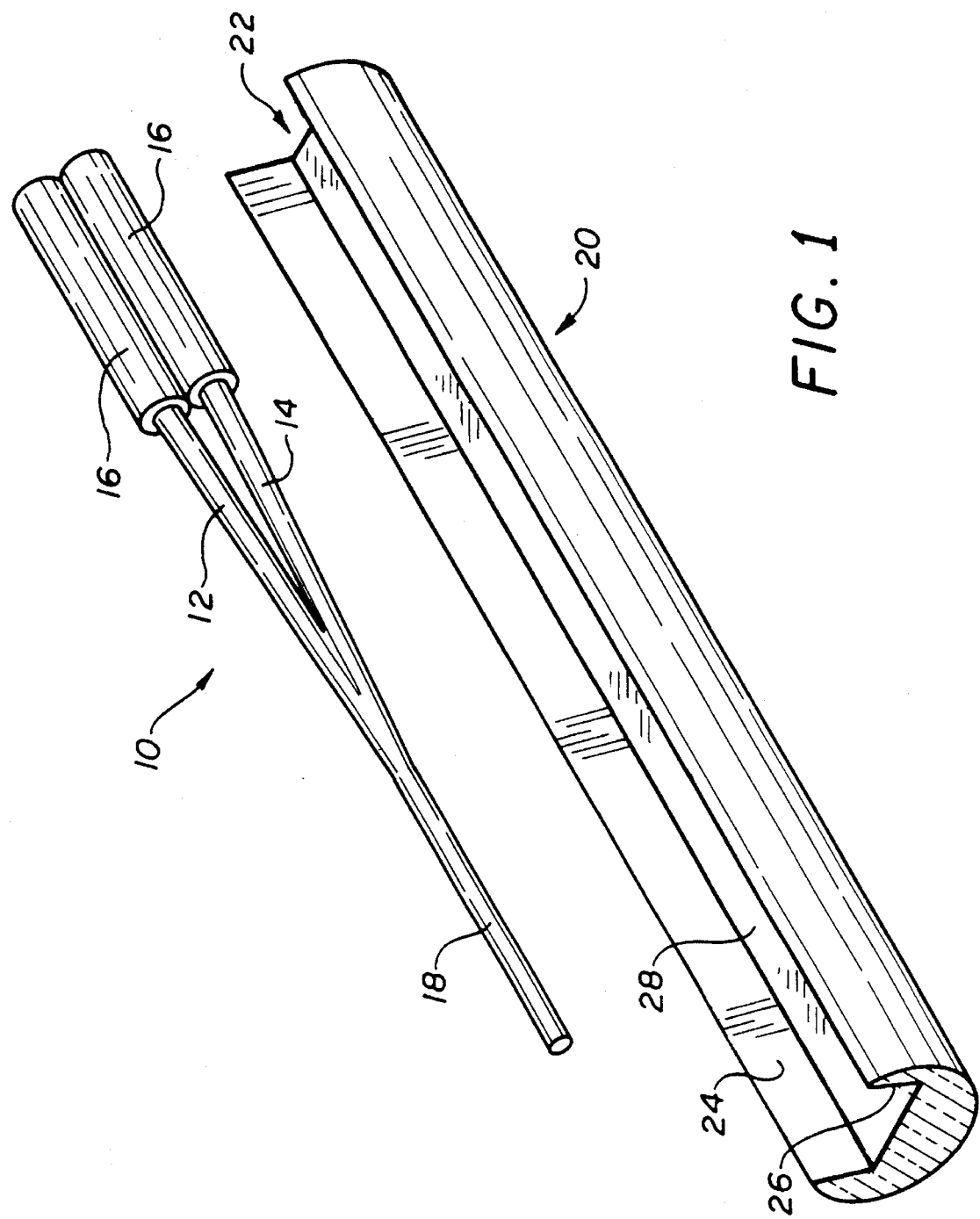
FIG. 1 is a schematic representation of a portion of a fused fiber optic coupler and a support substrate.

Referring now to the drawings where the purpose is for illustrating a preferred embodiment of the invention only and not for purposes of limiting the same, FIG. 1 is a schematic view of a portion of a fused optical coupler 10 which is to be mounted to a support substrate 20 in accordance with the present invention. The present invention shall be described with particular reference to the fiber optic coupler 10 and support substrate 20 arrangement shown in FIG. 1, however, it shall be appreciated from a further reading of the specification that the present invention has broader applications in the field of fiber optics. More specifically, the present invention finds advantageous application in "packaging," securing or bonding a variety of optical fibers, components or devices. In this respect, the present invention may be utilized in packaging, positioning or connecting, optical fibers, a plurality of optical fibers held together by supporting means, couplers, connectors, attenuators, wavelength division multiplexers/demultiplexers, connectors, filters, switches, fiber pigtailed semiconductor lasers and isolators, and other glass-based elements. As set forth above, the present invention provides a means for securing a first optical fiber, component or device to a second optical fiber, component, device or substrate. In the embodiment shown in FIG. 1, the first optical element is comprised of a fiber optic coupler 10 and the second element is a support substrate 20 to which the coupler is to be attached. In FIG. 1, only half of the fiber coupler 10 is shown, it being understood that the other half of coupler 10 is similarly configured and is to be mounted to substrate 20 in a similar manner. Coupler 10 is comprised of fused side-by-side optical fibers 12, 14. An acrylate buffer 16 on fibers 12, 14 has been previously removed to expose glass fibers 12, 14, which are joined at a coupling region 18 by conventionally known techniques. To provide support to coupler 10, it is typically mounted to a substrate 20. Substrate 20 is typically formed of a silica-based glass material having a coefficient of thermal expansion closely matching that of silica glass optical fibers 12, 14.

In the embodiment shown, substrate 20 is a cylindrical rod having a longitudinally extending groove 22 formed therein. Groove 22 is generally defined by a pair of planar, sloping side surfaces 24, 26 and a planar bottom surface 28.

It will of course be appreciated, that a substrate 20 may have other shapes or configurations without deviating from the present invention. For example, substrate 20 may be other than a cylindrical rod. In this respect, substrate 20 may be an elongated rod having, for example, a circular, elliptical, rectangular or prismatic cross section. Further, such a rod-shaped substrate 20 may or may not have a longitudinal groove therethrough. Basically, substrate 20 can assume any configuration which supports or contains the optical fiber, element or component to be mounted thereto.

Figure 3A:
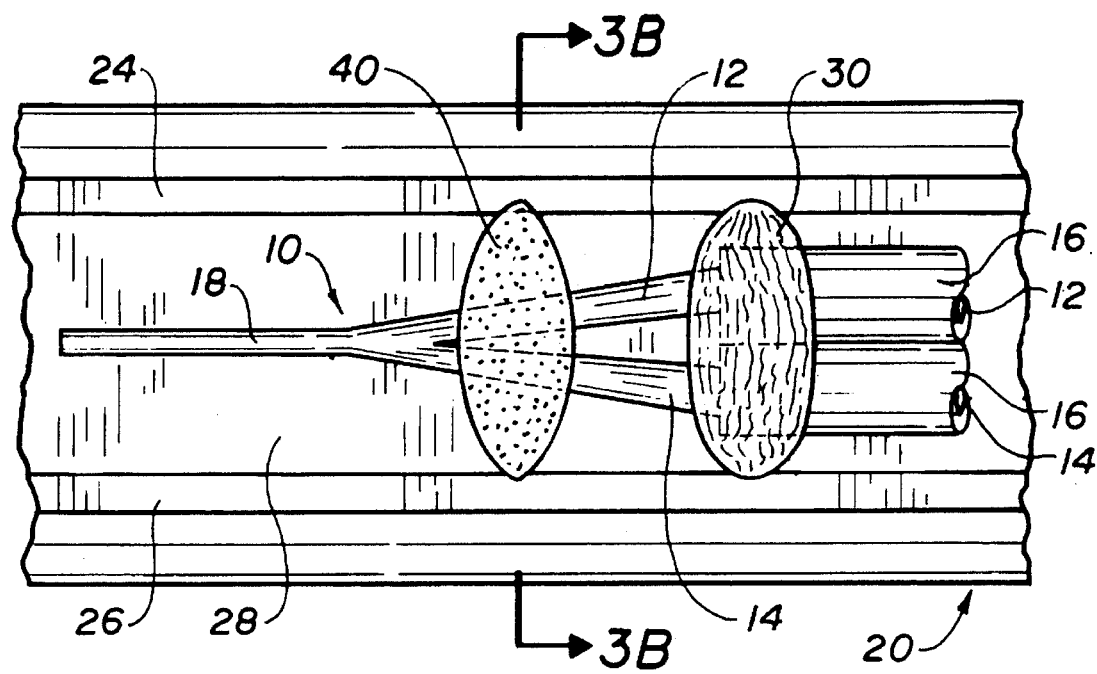
FIG. 3A is an enlarged, top plan view showing a portion of a fused coupler bonded to a support substrate in accordance with the present invention.
Figure 3B:
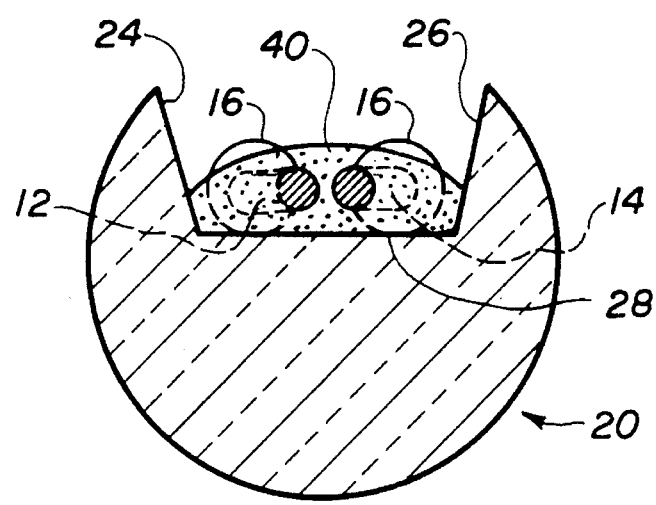
FIG. 3B is a sectional view taken along lines 3B—3B of FIG. 3A.

In accordance with the present invention, coupler 10 is generally positioned on substrate 20, as shown in FIGS. 3A and 3B. Individual fibers 12, 14 that are fused to form the fiber optic coupler may be mounted to substrate 20 by a small amount of UV curing epoxy, designated 30 in the drawings. Epoxy 30 is preferably confined to the regions of fiber 12, 14 where acrylate buffer coating 16 has not been removed. At this point, the primary purpose of epoxy 30 is to hold coupler fibers 12, 14 in place on support substrate 20 while coupler 10 is subsequently secured to the substrate 20 by the method to be described hereinafter. With respect to holding coupler fibers 12, 14 in place, it will of course be appreciated that other means such as mechanical fasteners, or other materials such as hot melt adhesives or other adhesives such as urethanes, acrylics, cyanoacrylates, water based adhesives or any other polymeric based adhesives could be used to temporarily hold coupler 10 in place on support substrate 20.

With coupler 10 positioned on substrate 20, a bonding composition, designated 40 in the drawings, is applied to coupler 10 and substrate 20 in the areas where coupler 10 is to be attached or secured to substrate 20. According to a preferred embodiment of the present invention, bonding composition 40 is specifically formulated to be both chemically and physically compatible as an adhesive with glass-based elements (i.e., to be compatible as an adhesive with the glass forming the substrate and the fibers of the coupler). Bonding composition is primarily comprised of a metal-oxide based solid amorphous material.

As used herein, the term "solid" refers to material ranging from a three-dimensional macroscopic member to a fine powder. Preferably, the metal-oxide based material is in powder form and when in this form is mixed with a binder component and a vehicle component. The mixture of the bonding component (i.e., the glass-based material), the binder component and the vehicle component, may range in consistency from a thick, cementitious paste to a sprayable slurry. In this respect, depending upon the nature of the optical elements to be bound and the manner in which the bonding composition is to be applied, the consistency of bonding composition 40 may be varied by varying the amounts and relative percentages of the respective components.

More specifically, the bonding component of bonding composition 40 is preferably a powdered mixture of silica and metal oxide based glasses. The binder component, typically nitrocellulose, is included in the composition solely to provide the powder with some "green strength" before it is heated. In other words, the binder component is provided to impart some dimensional stability to the glass-based particulate to enable the particulate to be positioned relative to coupler 10 and substrate 20. Importantly, the bonding component, (i.e., the glass powder) is formed of a glass or a ceramic, that when fused, has a thermal coefficient of expansion equal to, or approximately equal to, the thermal coefficient expansion of the glass material forming the fiber optic elements to be joined or secured. In the present embodiment shown, the thermal coefficient of expansion of the glass powder, and the fused glass resulting from the thermal fusion of the glass powder, would generally be equal to the thermal coefficient of expansion of coupler 10 and substrate 20.

Importantly, in addition to being a metal-oxide material and having a coefficient of thermal expansion equal to or approximately equal to the coefficient of thermal expansion of the optic elements to be secured, the glass powder forming the bonding component also preferably has a surface energy less than the surface energy of the optical fibers, components, substrate or devices to be secured. In this respect, as shall be described in greater detail below, the glass-based component of bonding composition 40 is provided as the adhesive or bonding material which will adhere the fiber optic elements together. While the glass powder and glass forming the fiber optic elements are similar materials, they are not identical and therefore "adhesive" forces (as distinguished from "cohesive" forces) will hold the respective materials together at the adhesive/adherend interface. Inasmuch as "wetting" is critical to good adhesions(Wetting is the sine qua non of adhesion), it is important that the surface energy of the glass powder be less than the surface energy of the optical elements to be bonded, as this will allow for good surface "wetting" and good adhesion. Accordingly, because it is the glass powder which forms the bonding or adhesive material, and it is the surface energy of the glass powder which is of importance, the surface energy of the glass powder should be less than the surface energy of the materials to be adhered.

Bonding composition 40 is preferably applied only a few millimeters along the length of exposed coupler fibers 12, 14. According to the present invention, intensive energy is applied locally to bonding composition 40 by means of a laser to heat the same. A carbon dioxide ($CO_2$) laser is preferably used in that such a laser has a specific optical wavelength, approximately $10.6 \times 10^{-6}$ meters. In addition to the glass powder of the glass bonding material, the silica based optical fibers, devices, components and substrate are all capable of absorbing electromagnetic radiation at the wavelength of a $CO_2$ laser as quoted above.

With no intent to be bound, it is believed that the glass powder and fiber optic elements heat up in accordance with the following explanation. The glass powder and fiber optic elements have a large absorptivity for electromagnetic radiation at the above-quoted wavelength of light. In effect, the complex portion of the dielectric function is large for the glass powder and fiber optic elements at the wavelength of the carbon dioxide laser as quoted above. The electronic nature of the glass powder and the fiber optic elements is such that the incident electromagnetic radiation at the above-quoted wavelength is absorbed and subsequently transformed into heat as the glass atoms and their associated electrons move more rapidly in response to the driving force of the incident electromagnetic radiation. The enhanced motion of the atoms and electrons comprising the glass powder or fiber optic elements is a result of the coupling between the incident electromagnetic radiation and the electrical charges and charge distributions present in the glass powder or fiber optic elements. In this respect, the bonding compound or preferably one of fiber optic elements is exposed to a laser beam with the above referenced wavelength at a sufficient power level such that the bonding composition or fiber optic element is heated rapidly. This affects the bonding composition or fiber optic element in several ways. As previously mentioned, as the laser beam illuminates the bonding composition and the substrate, the glass molecules, atoms and electrons therein absorb the laser energy and increase their average velocity. Heat from the glass powder or the substrate which results from the absorption of the electromagnetic radiation by the glass powder or the substrate is absorbed by the organic binder which burns away. As previously mentioned, the organic binder is pyrolyzed, but the heating is so short-lived that the binder may not completely burn away. Continued exposure of the glass powder or the fiber optic element or substrate 20 to the laser beam causes the remaining glass powder to soften sufficiently to wet the surfaces of the fiber optic elements and supporting substrate and to fuse the fiber optic elements to the silica-based supporting substrate. In the event that any one of the fiber optic elements is illuminated with the carbon dioxide laser, heat is thermally conducted to the glass bonding composition by the fiber optic elements. The illumination of any one of the fiber optic elements should continue until sufficient thermal energy is transferred to the glass bonding composition to cause the glass bonding composition to soften sufficiently to wet the surfaces of the fiber optic elements and to cause the fiber optic elements to bond together. Importantly, in this respect, the heat which softens the glass bonding composition and causes it to wet and bond to the optical components may be applied directly or indirectly, depending upon the nature of the type of components to be joined.

With respect to the embodiment shown, it is a preferred method of the present invention that the laser beam illuminates glass substrate 20 directly. It is a most preferred method of the present invention that the portion surface of glass supporting substrate 20 located directly below planar bottom surface 28 of groove 22 (i.e., the bottom of substrate 20) be illuminated with the electromagnetic radiation of the carbon dioxide ($CO_2$) laser. In all of the above mentioned preferred methods, thermal energy would be thermally conducted to glass bonding composition 40. Illumination should continue until sufficient thermal energy has been conducted to glass bonding composition 40 to soften the glass powder sufficiently to wet the surfaces of the fiber optic elements (i.e., fibers 12, 14 and substrate 20) and cause the elements to bond to one another as the glass powder fuses.

Importantly, strong ionic "cohesive" bonds are formed within the fused bonding glass and strong "adhesive" ionic bonds are formed between the fused bonding glass and the glass material forming the fiber optic coupler or, fiber optic elements including the supporting substrate. In other words, as the binder material essentially burns away, the glass powder essentially fuses together and bonds with the silica-based elements (i.e., glass substrate 20 and silica-based fiber optic coupler 10 or generally, the optical fibers, devices or components) forming ionic bonds therewith, which in the embodiment shown secures coupler fibers 12, 14 of coupler 10 to substrate 20 when cooled. The organic binder is essentially burned away, leaving essentially the glass powder, and perhaps some residual binder material as it is surmised that not all of the binder may burn away, to fuse together and to optical fibers 12, 14 and substrate 20 to adhere the same.

With respect to the energy to be applied to bonding composition 40, generally, it is necessary to provide sufficient energy to heat the glass powder component to a softened state sufficient to wet optical fibers 12, 14, couplers, components, devices and substrate and to fuse the glass powder, but not so much energy as to thermally shock or destroy the optical elements. In one respect, the energy to be applied is related to the composition and mass of the bonding component. In this respect, the enthalpy H (i.e., the energy under constant pressure) required to soften the bonding component (i.e., the glass powder) of the bonding composition is based upon the following equation:

$$H = mC_pT \text{ (the "Enthalpy Equation")};$$

where "H" is the enthalpy, "m" is the mass in kilograms of material (the glass powder), "$C_p$" is the specific heat under constant pressure in Joules/Kg°C. of the material, and "T" is the temperature change of the material between ambient (i.e., room) temperature and the desired elevated temperature at which the glass powder softens, wets the fiber optic elements and fuses (i.e., the desired temperature wherein the glass powder will fuse together and bond to the glass-based fiber optic elements). Accordingly, based upon the amount of bonding composition utilized, the approximate amount of energy required to cause the metal-oxide based glass powder bonding composition thereof to soften, wet, fuse and bond with the fiber optic elements may be calculated. It will of course be appreciated that a certain amount of energy will be required to heat and burn away some if not all of the binder component. Accordingly, the laser energy required to soften, wet, fuse and bond the bonding composition to the fiber optic elements is roughly dependent upon the amount (i.e., the mass) of the metal-oxide based component (i.e., the glass powder) in bonding composition 40. More energy may actually be required than predicted by the Enthalpy Equation previously cited.

Figure 2:
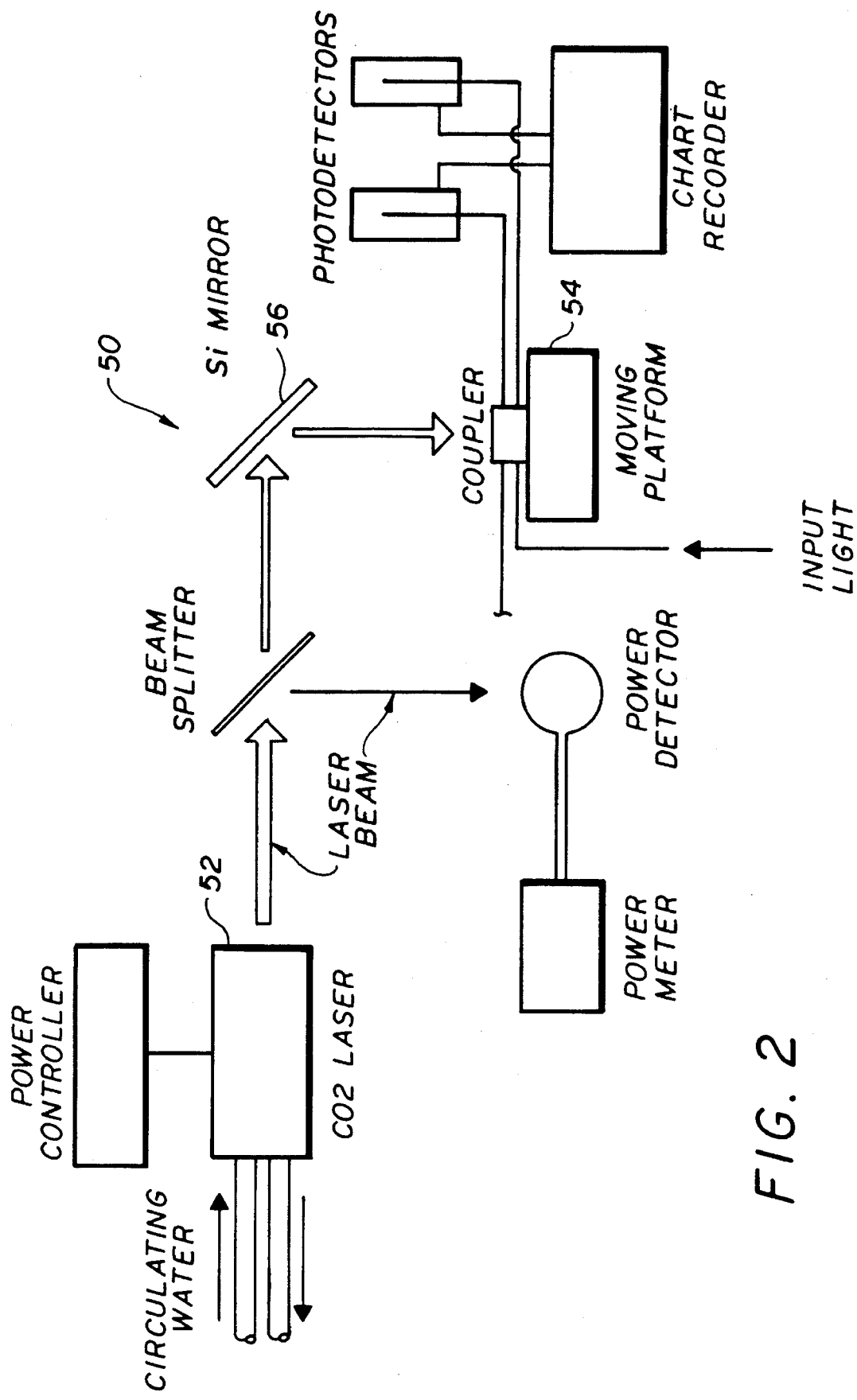
FIG. 2 is a schematic representation of an apparatus for use in attaching optical fibers, components or devices to substrates or to other optical fibers, components or devices, such as the coupler and substrate shown in FIG. 1.

Referring now to FIG. 2, a work station 50 including a $CO_2$ laser 52, some associated beam optics and a motorized work platform 54 for carrying out the process set forth above, is shown. The fiber optic elements to be joined (i.e., coupler 10 and substrate 20) are positioned on moving platform 54, and laser 52 is reflected onto bonding composition 40 by a silicon (Si) reflecting mirror 56.

Referring now to assembly of the coupler and substrate shown in FIG. 1, the following is an example of the procedure outlined above for bonding the coupler to a glass substrate.

As indicated above, the bonding composition utilized to secure the fused coupler to the substrate is comprised of a bonding component (i.e., glass powder), a binder component, and a vehicle component. Tests were conducted with a bonding component formed from powdered glass, wherein the glass had the following composition by weight:

| GLASS COMPOSITION | |
| --- | --- |
| COMPONENTS | % weight |
| LEAD OXIDES | <60% |
| SILICON OXIDES | <30% |
| ALUMINUM OXIDES | <15% |
| BORON OXIDES | <10% |
| ZINC OXIDES | <10% |
| LITHIUM OXIDES | <10% |

The glass is basically ground into a powder and the binder component is mixed into the glass component of the bonding composition. The binder component is comprised of nitrocellulose. In a preferred embodiment of the present invention, the powder is applied in a slurry form after being dispersed in a solvent based vehicle. The vehicle component is formed of amyl acetate (N) mixed with 2-methyl butyl acetate. The vehicle has a boiling point range of between 83° C. and 146° C. The vehicle is volatile and evaporates soon after the application of the slurry. The bonding composition used is thus comprised of powdered glass of the type described above, an organic binder as described above and a vehicle component as described above. This bonding compound is utilized to secure a fused fiber coupler to a silica glass support substrate.

As indicated above, coupler 10 is initially positioned on substrate 20 by means of an epoxy 30 applied at the ends of the acrylate coating 16. A small amount, from about three to about five cubic millimeters, of bonding composition 40 is applied to coupler 10 and substrate 20, a few millimeters beyond epoxy 30. Substrate 20 and coupler 10 are then placed on moving platform 54 and the carbon dioxide ($CO_2$) laser beam is applied to substrate 20 until sufficient thermal energy is thermally conducted to the glass bonding composition 40 such that the glass component softens sufficiently to wet the surfaces of fibers 12, 14 and substrate 20 and bond same together as the glass component fuses.

The carbon dioxide laser used has a beam diameter of approximately 3.5 mm, a beam power of approximately 3.5W and a beam scanning speed relative to the optical components of approximately 3 mm/min. The laser is applied to substrate 20 for approximately thirty to sixty seconds. As indicated above, the electromagnetic radiation indirectly heats the glass powder to a fusion and bonding temperature of approximately 380°–400° C. FIG. 2 shows work station 50 having a motorized work platform 54 for moving the workpiece relative to a stationary laser 52. It will of course be appreciated that heat may also be applied to a stationary workpiece by means of a moving heat source.

Figure 4:
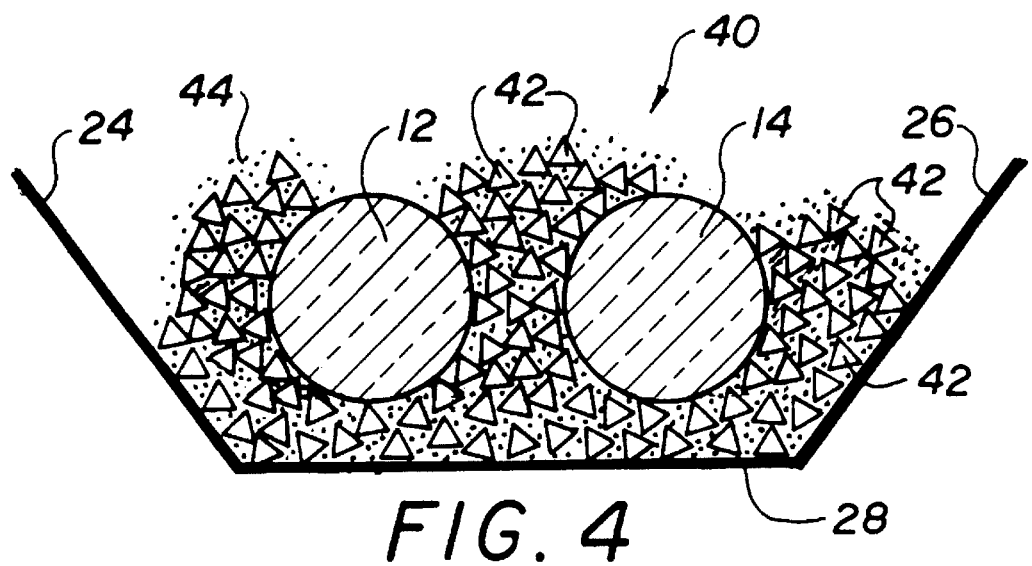
FIG. 4 is an enlarged sectional view showing glass fibers of a coupler supported on a glass substrate, and graphically illustrating a bonding compound comprised of glass particulate in a binder matrix for securing same.
Figure 5:
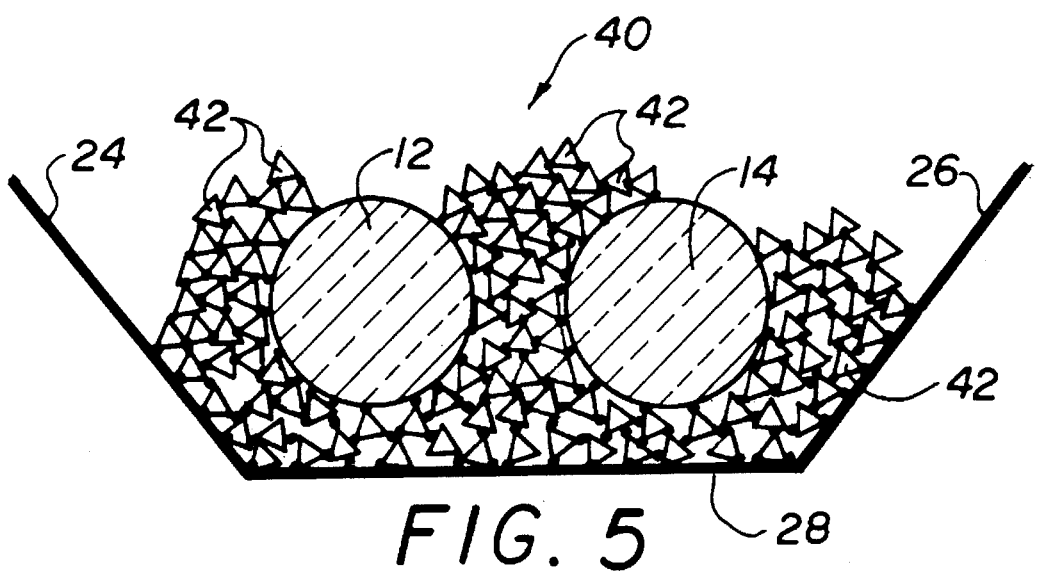
FIG. 5 is a sectional view of the fibers and substrate shown in FIG. 4, graphically depicting the glass particulate after it has been bonded to the glass fibers and glass substrate.

FIGS. 4 and 5 generally illustrate the foregoing process. In FIG. 4, bonding composition 40 is shown in contact with fibers 12, 14 and surfaces 24, 26, 28 of substrate 20. In FIG. 4, bonding composition 40 is illustrated as comprised of glass particulate (i.e., powder) 42 dispersed in binder 44. As will be appreciated, glass particulate 42 is shown in exaggerated form for purposes of illustration. As indicated above, binder 44 provides "green strength" or dimensional stability to glass particulate 42 to enable same to be applied about fibers 12, 14 and substrate 20. FIG. 5 generally illustrates bonding composition 40 after the thermal energy has been applied. In this respect, binder 44 has generally been burned away, and glass particulate 42 has bonded together and to fibers 12, 14 and surfaces 24, 26, 28 to form a bond therewith.

It is believed that the bonds formed according to the present invention between the fiber optic elements and the bonding composition may be ionic in nature. It is further surmised that London dispersion forces may play a part in the bonding between the fused glass bonding material and the surfaces of the fiber optic elements.

The molecules of the glass powder bond together, and being of like material, form cohesive bonds. The molecules of the glass powder in contact with the glass material forming the fiber optic elements, i.e., fiber 12, 14, (which include supporting substrate 20), being of different materials, form adhesive bonds with the glass molecules of fibers 12, 14. With respect to the later adhesive bonds, the lower surface energy of the glass powder ensures good "wetting" of the higher energy surfaces of the fiber optic elements, thereby facilitating good adhesive bonds therebetween. The resulting glass-to-glass bonds (both cohesive and adhesive) formed by the bonding composition are very strong and impervious to moisture.

Because the resulting bonding component (i.e., the glass powder) has a coefficient of thermal expansion that closely matches that of the fiber optic elements (i.e., in the embodiment shown optic fibers 12, 14 and substrate 20), misalignment of the components and/or cracking of the bonding material does not occur during thermal expansion or contraction. This matching of the coefficient of thermal expansion between the fused glass bonding component and the fiber optic elements results in a prevention of stress build-up at the interface of the fused glass bonding material and fiber optic elements.

After fibers 12, 14 have been fused to substrate 20 by the glass bonding component of glass bonding composition 40, it has been discovered that motion of the individual optical fibers 12, 14 may result in stress concentrations within fibers 12, 14 at points where fibers 12, 14 are adhered (i.e., bonded) to the other elements. To alleviate this situation, in some instances it may be desirable to apply a strain relief material that would adhere fibers 12, 14 to support substrate 20 a short distance from the point where fibers 12, 14 are fused to substrate 20. If the strain relief material were flexible, this would alleviate the stress build-up in fibers 12, 14 at the point where fibers 12, 14 are fused to substrate 20 by the glass bonding component. Parenthetically, this point of fusion is non-forgiving to motion of fibers 12, 14 as the glass bonding material has very little flexibility. Any motion of fibers 12, 14 would stress fibers 12, 14 at the point where fibers 12, 14 are fused to substrate 20 due to the inflexibility of the fused glass bonding component. The flexibility of a strain relief material should be greater than the flexibility of the fused glass bonding material and hence, more forgiving than the fused glass bonding material. Attachment of fibers 12, 14 by the flexible strain relief material to supporting substrate 20 would tend to dampen the motion of fibers 12, 14 at the point of fusion of the fibers to substrate 20. This would decrease the internal stress build-up within fibers 12, 14 at the point of bonding of fibers 12, 14 to substrate 20 which could arise as a result of flexing.

In this respect, as indicated above, a UV epoxy 30 was originally used to locate and maintain fiber optic coupler 10 in position on substrate 20 during the bonding procedure. The same epoxy 30 may be maintained in its position to act as a strain relief material to minimize the internal stresses within fibers 12, 14 at the point of bonding between fibers 12, 14 and substrate 20. It will of course be appreciated that other arrangements or materials may be utilized to limit the relative motion of the components in the glass-to-glass bonding area. For instance, other flexible strain relief materials and means including mechanical means may be used to attach fibers 12, 14 to supporting substrate 20 a short distance from the glass-to-glass bonding area. In particular, any material that has a greater flexibility than the fused glass bonding material and that would adhere to fibers 12, 14 and substrate 20, may be employed as a strain relief material. Further, a hot melt adhesive, a urethane adhesive, a cyanoacrylate adhesive, rubber cement, a water based adhesive or any other polymeric based adhesive that would adhere generally to the fiber optic elements and specifically to optical fibers 12, 14 and supporting substrate 20, may be utilized instead of the epoxy 30 to confine fibers 12, 14.

According to the present invention, the respective cohesive and adhesive glass bonds developed within the glass bonding material and between the glass bonding material and the fiber optic elements have been found to be less susceptible to adverse environmental conditions, and to have less affect over time, on the operation of the components.

In this respect, the chemical bonds between the fibers and the fused glass bonding material and between the supporting substrate and the fused glass bonding material did not appear to weaken as a result of exposure to moisture. Furthermore, by using materials with similar coefficients of thermal expansion, bonded components and devices are optically and mechanically very stable under dynamic temperature conditions.

Not only does the use of the glass bonding composition disclosed in this invention result in beneficial attachment means, the disclosed bonding composition may be used so as to result in a bond that protects and hermetically seals the fiber optic elements from the adverse effects of moisture, vapors, such as water vapor, and detrimental gases.

Further, this new technique for packaging fiber couplers is simple, consistent and may be readily adapted for use in a production environment. It does not significantly add to the time it takes to manufacture a coupler and does not require the use of any specialized hardware other than the glass bonding material and a method of producing sufficient localized heat to soften the glass bonding material to the point at which it wets the fiber optic elements.

Figure 6:
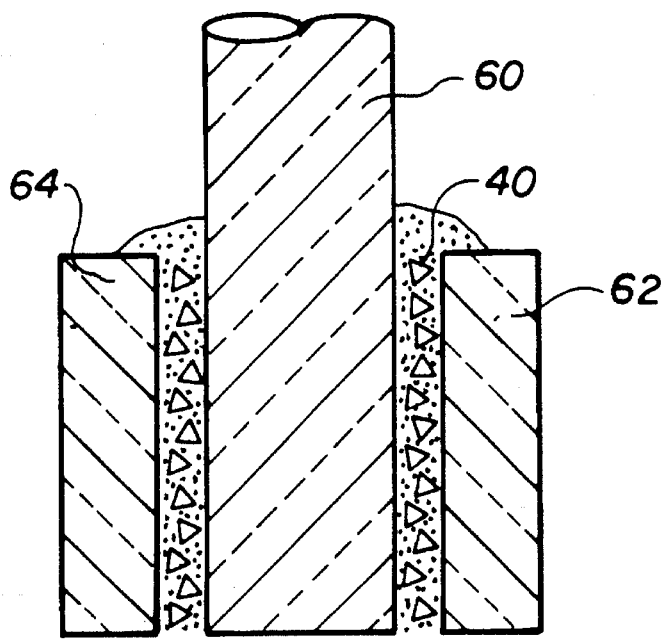
FIG. 6 is an enlarged sectional view of an optical fiber disposed within a ceramic ferrule.

While the present invention has been described with respect to securing a coupler to a glass substrate, it will be appreciated that the procedure described above may be applied to a variety of other optical fibers, components or devices for securing, locating or positioning same relative to a glass substrate or other fiber optic components, devices or fibers. For example, the present invention also finds advantageous application in securing an optical fiber 60 to a connector ferrule 62, as shown in FIG. 6.

Heretofore, optical fibers have typically been secured to connector ferrules by means of an epoxy material. The optical fiber is positioned within a bore extending axially through the ferrule, and epoxy material is used to secure the fiber to the ferrule. The end of the fiber and the end surface of the ferrule are then polished to provide an optical surface for mating with other connectors. A problem with the use of an epoxy material is that it abrades more rapidly than glass or ceramic material, of which the ferrules are typically formed. This can cause surface imperfections in the optical surface. Further in this respect, a connector formed with epoxy is subject to the same environmental deterioration as discussed above with respect to couplers. In this respect, thermal expansion may cause the optical fiber to piston in and out of the ferrule upon thermal cycling. Furthermore, prolonged exposure to humidity may cause the epoxy to deteriorate, thereby weakening the attachment of the fiber to the ferrule.

The present invention provides a means for securing optical fibers to ceramic ferrules or even glass ferrules. In this respect, fiber 60 may be bonded to ferrule 62 utilizing glass-based bonding compound 40. Bonding composition 40 is disposed between the outer surface of fiber 60 and the inner surface of bore 64 through ferrule 62. It is advisable to apply a small amount of bonding composition 40 to the tip of ferrule 62 and about fiber 60 in order to adequately support the fiber during subsequent polishing operations. By directing the optical energy of the laser onto ferrule 62, bonding composition 40 fuses to both ferrule 62 and optical fiber 60. Attaching fiber 60 to ferrule 62 in this manner provides a connector less susceptible to degradation as a result of environmental conditions, for the reasons previously mentioned. Further, by utilizing glass-based bonding composition 40, which ionically bonds to the fiber 60 and ferrule 62, the end surfaces of fiber 60 and ferrule 62 may be polished and provide a smooth continuous mating surface.

Figure 7:
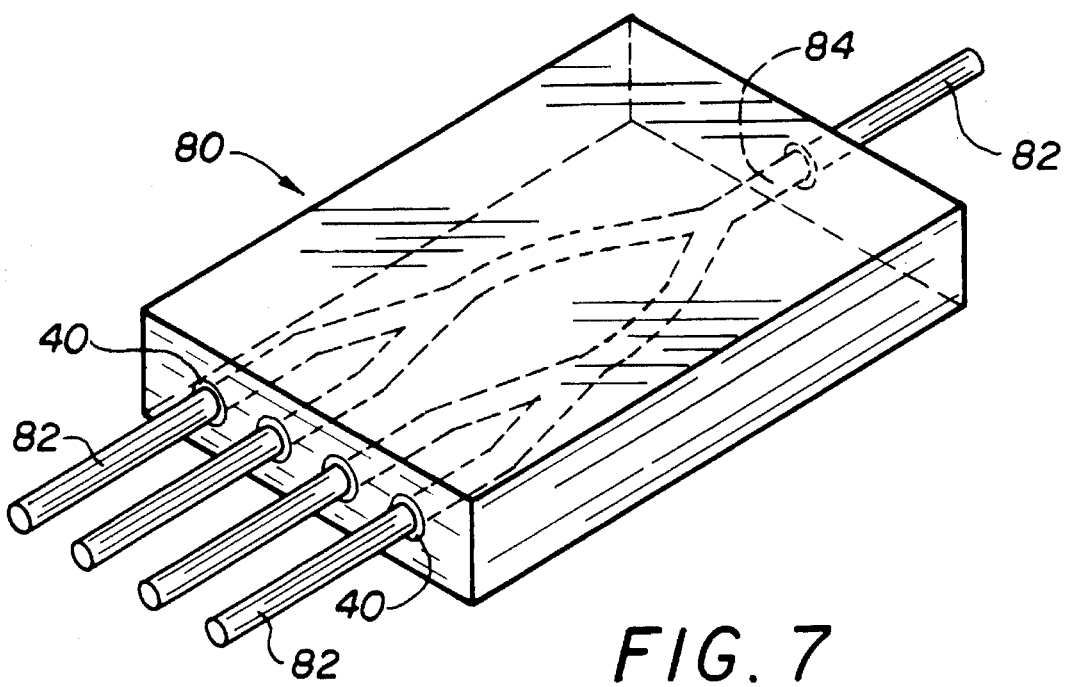
FIG. 7 is an enlarged perspective view of a planar waveguide component with optical fibers attached thereto.

Referring now to FIG. 7, a further application of the present invention is shown. In FIG. 7 a planar waveguide component 80 is shown having optical fibers 82 attached thereto. The ends of optical fibers 82 can be attached to planar waveguide component 80, in optical alignment with the optical waveguides 84 therethrough, by means of bonding composition 40 as outlined above. In this respect, the ends of fibers 82 may be placed in optical contact and alignment with the optical waveguides 84 of waveguide component 80, and bonding composition 40 utilized to secure same together. Attaching optical fibers 82 to planar waveguide component 80 in this manner provides for a connection that is less susceptible to degradation as a result of environmental conditions, for the reasons previously mentioned.

A means for simultaneously joining a plurality or an array of fibers to a planar waveguide component is also contemplated by the present invention. For example, a plurality or an array of optical fibers may be first attached to a supporting member. The ends of each of the individual optical fibers 82 may then be placed in optical registry with and adhered to the waveguides 84 by the bonding composition and the bonding methods disclosed herein. In another instance, the optical fibers may be first attached to a supporting member; the ends of each of the optical fibers 82 may then be placed in optical registry with the waveguides 84; and the supporting member may then by attached and adhered to the planar waveguide component by the bonding composition and the bonding methods disclosed herein. It is contemplated that the supporting member be made of a material such as glass, preferably glass with a coefficient of thermal expansion comparable to the coefficient of thermal expansion of the optical fibers supported thereby, and more preferably, glass that not only has a coefficient of thermal expansion comparable to the coefficient of thermal expansion of the optical fibers supported thereby, but that has a surface energy larger than the glass bonding compound applied thereto.

Figure 8A:
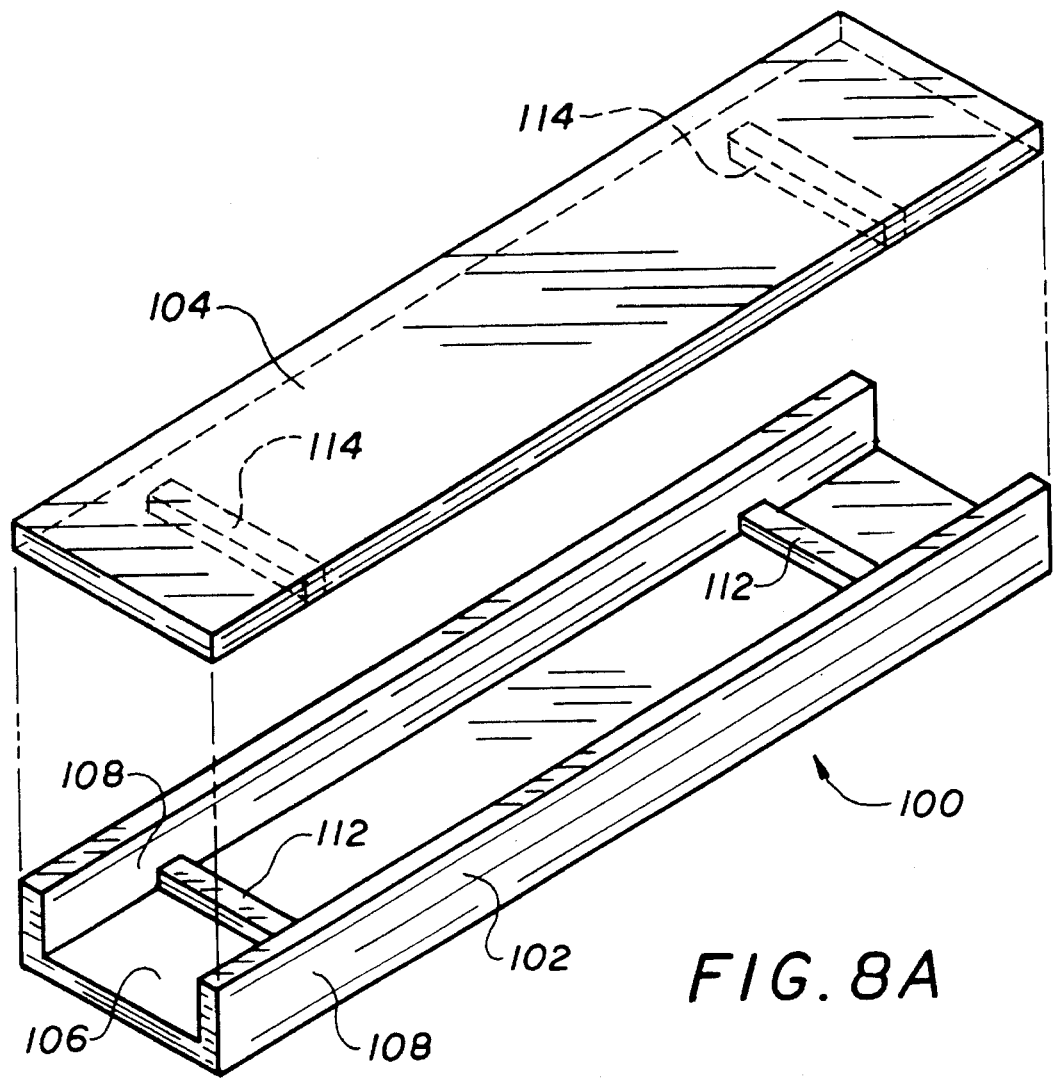
FIGS. 8A, 8B and 8C are views of an optical element housing.
Figure 8B:
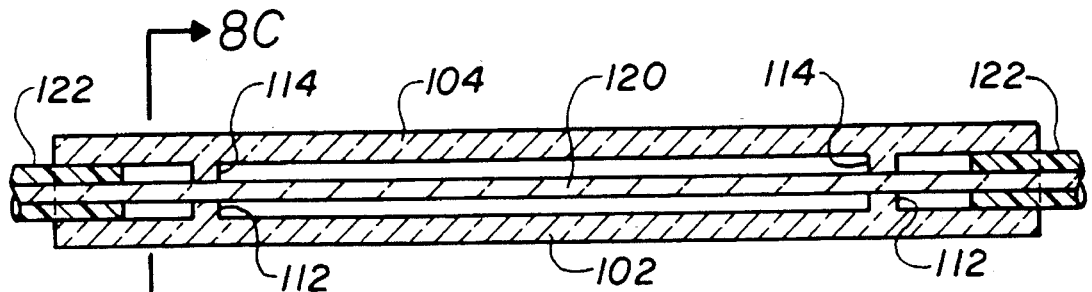
Figure 8C:
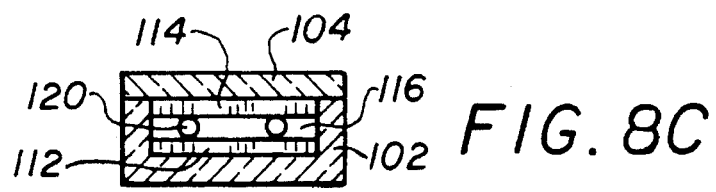

Referring now to FIGS. 8A, 8B and 8C, a housing 100 for enclosing an optical element, such as a coupler, is shown. Housing 100 is comprised of a lower housing section 102 and an upper housing section 104. Lower housing section 102 is generally channel-shaped, having a flat bottom wall 106 and upward extending side walls 108. Spaced apart ribs 112 project from bottom wall 106 and extend between side walls 108. Upper housing section 104 is generally a flat planar member dimensioned to mate with lower housing section 102. Spaced apart ribs 114 project from the lower surface of upper housing section 104 and extend generally from side to side. Ribs 114 on upper housing section 104 are disposed to be in registry with ribs 112 on lower housing section 102. Ribs 112 and 114 are dimensioned such that a space 116, best seen in FIG. 8C, is defined therebetween when lower housing section 102 and upper housing section 104 are mated together. In this respect, ribs 112, 114 are dimensioned such that space 116 is approximately equal to the diameter of a bare optical fiber 120, which may be positioned therebetween, as shown in FIGS. 8B and 8C. Side walls 108 of lower housing section 102 are preferably dimensioned such that the spacing between upper housing section 104 and bottom wall 106 of lower housing section 102 is such that the acrylate buffer portion 122 of the optical fiber 120 is confined therebetween as best seen in FIG. 8B.

According to one aspect of the present invention, upper housing section 104 may be secured to lower housing section 102 by applying bonding composition 40 along the upper edges of side walls 108, heating same until bonding composition 40 has softened sufficiently to wet the respective mating surfaces of housing sections 102, 104 and bond same together. Preferably, bonding composition 40 is also applied in space 116 around the bare optical fibers 120. In this respect, by forming a glass bond between ribs 112, 114 and glass fibers 120, together with forming a bond between housing sections 102, 104, the coupler is hermetically sealed within housing 100, thereby preventing exposure of the coupler to humidity or other potentially adverse gases. An epoxy (not shown) may also be applied to the distal ends of housing 100 around acrylate buffer 122 of optical fibers 120 to secure same to housing 100 and to further provide a second barrier layer to environmentally seal the coupler.

Fiber optic elements may be hermetically sealed to each other by an appropriate use of the glass bonding composition. That is, the glass bonding composition may be placed at points or regions along the fiber optic elements at which hermetic seals are desired. The glass bonding material is then heated and fused according to the methods disclosed herein. As the fused glass is impervious to water vapor, the fused glass forms, in and of itself, an hermetic seal.

In accordance with another aspect of the present invention, housing sections 102, 104 may be formed of the metal-oxide based silica glass, described above, and ribs 112, 114 may be modified to abut each other and to include semi-cylindrical recesses specifically formed to support and confine the bare glass fibers therein. Then, by applying localized heat along the abutting edges of housing sections 102, 104, and along the outer surface of housing sections 102, 104 and in the vicinity of ribs 112, 114, it is possible to bond housing 100 directly to the bare glass optical fibers and seal same. In this respect, the glass forming housing sections 102, 104 will softened until the engaging surfaces thereof bond together and bond to the glass optical fiber.

As thus shown, the present invention may be used to attach fibers directly to other glass elements such as graded-index lenses, mirrors, filters, glass windows or the like. Moreover, the present procedure is not limited to optical fiber technology, but may be used to secure almost any type of glass element to a glass base substrate. For example, prisms, mirrors, filters, lenses, etc. may be bonded to each other or to other glass-based components according to the present invention. In this respect, the present invention may be used to attach optical fibers together either end-to-end or side-by-side, and may also be used to affix glass elements together. Further, while the present invention has been described with respect to a $CO_2$ laser, alternative heat sources such as lasers in general, a gas burning flame, a small flame from a miniature oxy-acetylene torch, a small electric heater, an electric arc, an infrared heater or ion bombardment may be used to provide the heat to melt and fuse the metal-oxide based component of the bonding material so long as such heat source has sufficient energy and intensity to soften the glass bonding material to the point where the glass bonding material wets the fiber optic elements and is sufficiently localized to avoid damage to the fiber optic elements.

The foregoing and other modifications will occur to others upon a reading and understanding of the specification.

It is intended that all such modifications, alterations and applications be included insofar as they come within the scope of the patent as claimed or the equivalents thereof.

Having thus described the invention, the following is claimed:

1. An assembly comprised of a first element having a glass-based portion, a second element having a glass-based portion and a glass-based compound comprised primarily of metal oxides bonded to said glass-based portions of said first and second elements, said assembly formed by the steps of:

positioning said glass-based portion of said first glass-based element relative to said glass-based portion of said second element;

applying a glass-based compound comprised primarily of metal oxides about said glass-based portions of said first and said second elements; and applying sufficient heat to said glass-based compound to cause said glass-based compound to soften, wet the surfaces of said glass-based portions of said elements and bond thereto.

2. An assembly as defined in claim 1 wherein said glass-based compound has a coefficient of thermal expansion approximately equal to the coefficients of thermal expansion of said first or said second elements.

3. An assembly as defined in claim 1 wherein said glass-based compound includes lithium oxides and zinc oxides.

4. An assembly as defined in claim 3 wherein said glass-based compound includes glass particulate.

5. An assembly as defined in claim 1 or 4 wherein said glass-based compound is primarily formed of metal oxides having the following approximate composition by weight:

| lead oxides | <60% |
| silicon oxides | <30% |
| aluminum oxides | <15% |
| boron oxides | <10% |
| zinc oxides | <10% |
| lithium oxides | <10%. |

6. An assembly as defined in claim 1 wherein said glass-based compound is comprised primarily of lead oxides, aluminum oxides and silicon oxides.

7. An assembly as defined in claim 6 wherein said glass-based compound is a solid.

8. An assembly as defined in claim 6 wherein said glass-based compound has a cementitious, paste-like consistency.

9. An assembly as defined in claim 6 wherein said glass-based compound is a sprayable fluid.

10. A housing for encasing at least one glass-based element, said housing comprised of at least one housing section formed of a glass-based compound having a coefficient of thermal expansion approximately equal to said element and having a surface energy which is less than the surface energy of said element, wherein said glass-based compound is primarily formed of metal oxides having the following approximate composition by weight:

| lead oxides | <60% |
| silicon oxides | <30% |
| aluminum oxides | <15% |
| boron oxides | <10% |
| zinc oxides | <10% |
| lithium oxides | <10%. |

11. A housing defined in claim 10 wherein said housing is comprised of a plurality of housing sections having mating surfaces.

12. A housing as defined in claim 10, wherein said housing encases and hermetically seals said at least one glass-based element.

13. An optical assembly comprised of an optical element having a glass-based portion and a glass-based support member formed of a glass material having a coefficient of thermal expansion which is closely matched to said optical element chemically bonded to said glass-based portion, said assembly formed by the steps of:

exposing the glass portion of said glass-based optical element;

positioning the exposed portion of the glass-based optical element adjacent to said glass-based support member;

directing a laser beam to said glass-based support structure to cause said structure to soften in the area of said glass-based portion, to wet the surface of said portion and to bond thereto.

14. An optical assembly as defined in claim 13, wherein said glass-based support member is formed primarily of lead oxides.

15. An optical assembly comprised of:

at least one optical fiber having a glass-based portion;

at least one element having a glass-based portion; and a glass-based compound bonded to said glass-based portion of said optical fiber and to said glass-based portion of said element, said compound comprised primarily of glass material and having a coefficient of thermal expansion approximately equal to the coefficient of thermal expansion of said glass-based portions of said optical fiber and said element and a surface energy less than the surface energies of said glass-based portions of said optical fiber and said element.

16. An assembly as defined in claim 15, wherein said glass-based compound is formed primarily of lead oxides.

17. An assembly as defined in claim 16, wherein said glass-based compound includes lithium oxides and zinc oxides.

18. An assembly as defined in claim 15, wherein said element is a support element having a bore therein receiving said optical fiber.

19. An assembly as defined in claim 18, wherein said support element is formed of a ceramic.

20. An assembly as defined in claim 15, wherein said optical assembly includes a fiber optic coupler and said element is a support substrate.

21. An assembly as defined in claim 15, wherein said element is a housing encasing said coupler.

22. An assembly as defined in claim 15, wherein said glass-based compound hermetically seals said optical fiber to said element.

23. An assembly as defined in claim 15, wherein said element is a waveguide component.

24. An assembly as defined in claim 15, wherein said glass-based compound is primarily formed of metal oxides having the following approximate composition by weight:

| | |
|---|---|
| lead oxides | <60% |
| silicon oxides | <30% |
| aluminum oxides | <15% |
| boron oxides | <10% |
| zinc oxides | <10% |
| lithium oxides | <10%. |

25. An assembly comprised of:

an element having a glass-based portion; and a glass-based element chemically bonded to the glass-based portion of said element, said glass-based element having a coefficient of thermal expansion approximately equal to the coefficient of thermal expansion of said glass-based portion of said element and having a surface energy less than the surface energy of said glass-based portion of said element.

26. An assembly as defined in claim 25, wherein said glass-based element is a support member formed primarily of lead oxides.

27. An assembly as defined in claim 25, wherein said glass-based element is primarily formed of metal oxides having the following approximate composition by weight:

| | |
|---|---|
| lead oxides | <60% |
| silicon oxides | <30% |
| aluminum oxides | <15% |
| boron oxides | <10% |
| zinc oxides | <10% |
| lithium oxides | <10%. |

\* \* \* \* \*